(12) United States Patent
Taich et al.

(10) Patent No.: US 7,729,464 B2
(45) Date of Patent: Jun. 1, 2010

(54) AIDING SYNCHRONIZATION BETWEEN MASTER AND SLAVE TRANSCEIVERS

(75) Inventors: Dimitry Taich, Cupertino, CA (US); Jose Tellado, Palo Alto, CA (US)

(73) Assignee: Teranetics, Inc., San Jose, CA (US)

( * ) Notice: Subject to any disclaimer, the term of this patent is extended or adjusted under 35 U.S.C. 154(b) by 830 days.

(21) Appl. No.: 11/644,598

(22) Filed: Dec. 22, 2006

(65) Prior Publication Data

US 2008/0151792 A1    Jun. 26, 2008

(51) Int. Cl.
*H04L 7/00* (2006.01)

(52) U.S. Cl. ............... 375/358; 375/221; 375/356; 375/373

(58) Field of Classification Search .......... 375/212, 375/219, 222, 221, 356, 358, 373
See application file for complete search history.

(56) References Cited

U.S. PATENT DOCUMENTS

| | | | |
|---|---|---|---|
| 5,343,469 A | * | 8/1994 | Ohshima .............. 370/431 |
| 6,385,263 B1 | * | 5/2002 | Bowers et al. .............. 375/356 |
| 6,516,040 B1 | * | 2/2003 | Lecourtier et al. .......... 375/356 |
| 6,778,602 B2 | | 8/2004 | Agazzi et al. |
| 6,792,038 B2 | | 9/2004 | Agazzi |
| 6,922,436 B1 | * | 7/2005 | Porat et al. .................. 375/222 |
| 6,952,456 B1 | | 10/2005 | Aillo et al. |
| 6,968,024 B1 | * | 11/2005 | Perino ........................ 375/354 |
| 6,993,673 B2 | | 1/2006 | Greiss et al. |
| 7,062,005 B2 | * | 6/2006 | Gresham .................... 375/375 |
| 7,068,726 B1 | * | 6/2006 | Zortea ........................ 375/285 |
| 7,088,795 B1 | | 8/2006 | Aillo et al. |

* cited by examiner

*Primary Examiner*—Dac V Ha
(74) *Attorney, Agent, or Firm*—Brian R. Short

(57) ABSTRACT

An apparatus and method of aiding synchronization between a master transceiver and a slave transceiver is disclosed. The method includes the master transceiver transmitting data signals that are received by the slave transceiver. The slave transceiver locks a slave clock to the data signals with a slave phase-locked loop. The slave transceiver transmits slave clock information to the master transceiver.

20 Claims, 5 Drawing Sheets

The master transceiver transmitting data signals that are received by the slave transceiver

210

The slave transceiver locking a slave clock to the data signals with a slave phase-locked loop

220

The slave transceiver transmitting slave clock information to the master transceiver

The transceiver transmitting data signals to a link partner transceiver

310

Receiving slave clock information from the link partner transceiver

320

The transceiver adaptively adjusting processing according to the slave clock information provided by the link partner transceiver

330

FIGURE 3

AIDING SYNCHRONIZATION BETWEEN MASTER AND SLAVE TRANSCEIVERS

FIELD OF THE INVENTION

The invention relates generally to communication systems. More particularly, the invention relates to aiding synchronization between master and slave transceivers.

BACKGROUND OF THE INVENTION

High-speed LAN technologies include 100BASE-T (Fast Ethernet), 1000BASE-T (Gigabit Ethernet), and 10GBASE-T. These high-speed LAN technologies include link partner transceivers that can communicate, for example, over a bi-directional transmission channel. An exemplary transmission channel includes four pairs of copper wire.

Proper operation of the Ethernet link partners requires them to be synchronized. Synchronization can be obtained by one link partner phase-locking a clock to data signals transmitted by the other link partner. The transmitter and receiver processing of one of the transceiver link partners are clocked by the phase-locked clock. For Ethernet systems, data signals can be distorted during link establishment. In addition, external noise can be added onto the data signals, that can add excessive jitter to the phase-locked clock or cause the clock to lose phase-lock. Too much jitter on the clock signals can introduce excessive errors to the transmission and/or reception of data signals between the transceiver link partners.

A master transceiver can monitor a phase error signal of signals received from a slave transceiver link partner. Therefore, the phase error provides an indication of the quality of the phase-lock of the slave transceiver link partner. This, however, is undesirable because the master transceiver is required to support the error detection circuitry, and the phase-lock status detection happens with a time delay after the slave transceiver link partner loses phase-lock. If detected, the first transceiver can drop the link with the second transceiver link partner, or stop adaptation of processing of data signals received from the second transceiver link partner.

It is desirable to have a system, apparatus and method of aiding synchronization between Ethernet transceiver link partners. It is desirable that the method and apparatus operate efficiently, and not require excessive amounts of additionally electronic circuitry.

SUMMARY OF THE INVENTION

An embodiment includes a method of aiding synchronization between a master transceiver and a slave transceiver. The method includes the master transceiver transmitting data signals that are received by the slave transceiver. The slave transceiver locks a slave clock to the data signals with a slave phase-locked loop. The slave transceiver transmits slave clock information to the master transceiver.

Another embodiment includes a method of adaptively adjusting processing of a master transceiver. This method includes the master transceiver transmitting data signals to a link partner transceiver. The master transceiver receives slave clock information from the link partner transceiver. The master transceiver adaptively adjusts processing according to the slave clock information provided by the link partner transceiver.

Another embodiment includes a method of maintaining phase-lock with a master transceiver. This method includes a slave transceiver phase-locking a slave clock to data signals received from a master transceiver, and the slave transceiver providing the master transceiver with slave clock information.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 2 is a flow chart showing steps of one example of a method of synchronizing master and slave transceivers.

FIG. 3 is a flow chart showing steps of one example of a method of a master transceiver aiding synchronization with a slave transceiver.

DETAILED DESCRIPTION

The invention includes an apparatus and method for aiding synchronization between master and slave transceivers. The slave transceiver provides the master transceiver with slave clock signal information, allowing the master transceiver to adapt its processing.

It is to be appreciated that the present teaching is by way of example, not by limitation. Therefore, although the embodiments described herein are for convenience of explanation, it is to be appreciated that the principles herein may be applied equally to other configurations of aiding synchronization between master and slave transceivers.

Synchronization between master and slave transceivers is generally required to ensure reliable initialization between the master and slave link partners. Current status information of a link partner allows for a reliable prediction of next stage and/or action by the link partner.

Figure 1:
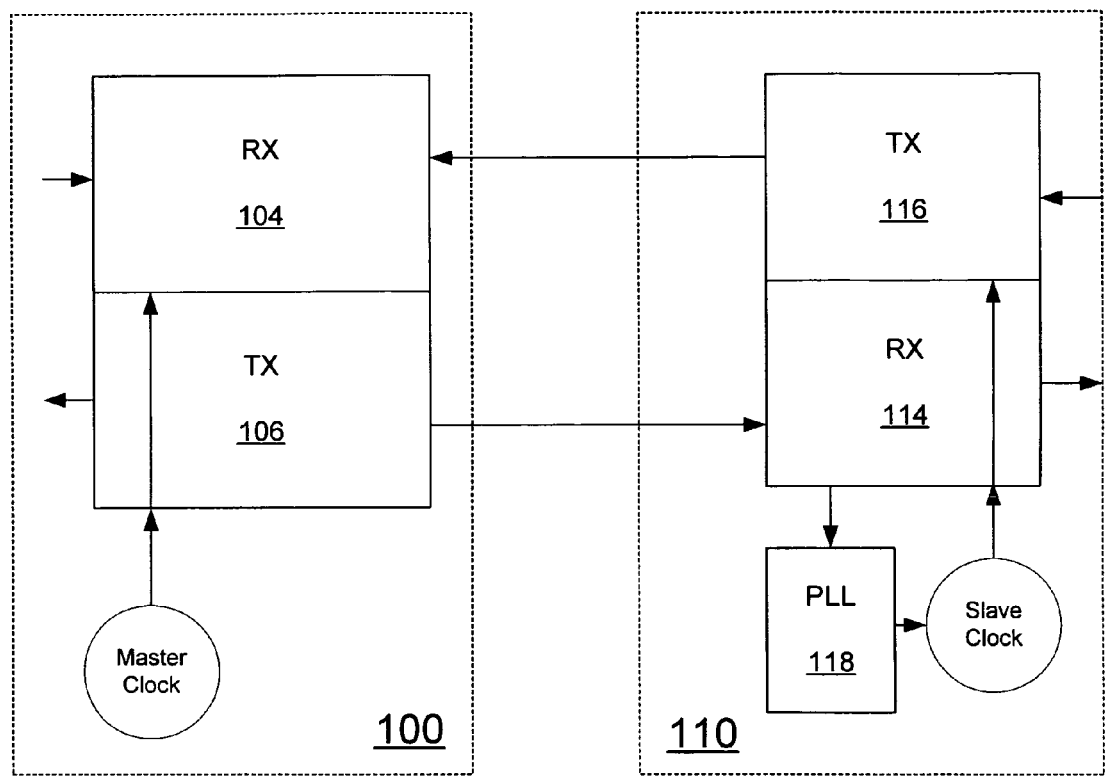
FIG. 1 shows one example of a master transceiver and a slave transceiver connected by a cable that can utilize methods of synchronizing the master and slave transceivers.

FIG. 1 shows a master transceiver 100 and a slave transceiver 110. The slave transceiver 110 receives data signals from the master transceiver 100, and phase locks a slave clock to the data signals using a phase-locked loop 118. The phase-locked loop 118 can be implemented with digital or analog circuitry. The data signals are not pure sinusoids, and it can be difficult to maintain a high quality phase-lock of the slave clock to data signals. As such, the slave transceiver 110 is susceptible to slave clock jitter if the data signals are distorted.

If the receive signals become distorted due to processing of either the master or the slave transceivers, the quality of the phase-lock of the slave clock can become worse. That is, jitter on the slave clock becomes larger because the phase-locked loop is not able to maintain a high-quality lock. If the jitter becomes too large, the data signals transmitted between the master transceiver 100 and the slave transceiver 110 can suffer from excessive errors. Therefore, it is extremely important to maintain synchronization (that is, a good quality phase-lock) and it is important for each transceiver to be aware when the quality of the phase-lock is below an acceptable threshold, causing degradation of the signal quality of the data signals transmitted between the transceivers.

For the purposes of this description, losing phase-lock can be interpreted as the quality of the phase-lock being so poor that the clock of the phase-locked loop suffers from a predetermined amount of jitter. Alternatively, losing phase-lock can be defined as when data signals between master and slave transceivers suffering from a predetermined level of errors due to the jitter of the phase-locked slave clock. Distortion of the data signals can cause the slave clock to suffer from jitter. Too much distortion of the data signals causes too much jitter on the slave clock, which can lead to the errors of the data communications between the master and slave transceivers. Errors of the data above the predetermined threshold cause the clock to be labeled "un-locked". The signal quality of the data signals can be characterized by SNR (signal to noise ratio), BER (bit error rate) or PER (packet error rate) measurements of the data signals, or phase error of the phase-lock loop.

Ethernet transceivers typically go through an auto-negotiation period that includes a series of hand-shakes to establish basic operating criteria. One of the criteria can include determining which transceiver is the master, and which transceiver is the slave. That is, the roles of the transceivers 100, 110 of FIG. 1 can be reversed as determined by the auto-negotiation process that initially occurs between the transceivers 100, 110. It is to be understood that other embodiments can include the master and slave relationship being determined outside of the auto-negotiation process.

A receiver section 114 of the slave transceiver 110 receives the data signals transmitted by a transmitter section 106 of the master transceiver 100. Timing information is extracted from the received data signals, and input to the phase-locked loop 118. The slave clock drives data processing of the receive section 114 and the transmitter section 116. Due to the fact that the data signals of the master transceiver 100 are driven (clocked) by the master clock of the master transceiver 200, the transmitter section 106 and receiver section 104 of the master transceiver 100 are synchronized with the transmitter section 116 and receiver section 114 of the slave transceiver 110.

Data processing of the master transceiver 100, such as changing power back-off, changing from half-duplex transmission to full-duplex transmission, or enabling THP (Tomlinson-Harashima precoder) preceding can distort the master transceiver data signals which can cause the slave transceiver 110 to lose phase-lock (that is, the quality of the phase-lock degrades to below a threshold) with the data signals. Once phase-lock is lost, the master transceiver 100 is no longer properly synchronized with the slave transceiver 110.

An embodiment includes the slave transceiver 110 informing the master transceiver 110 that the slave transceiver has lost phase-lock with the data signals of the master transceiver. The master transceiver 100 can then adaptively control its processing. The adaptive control can include the master transceiver suppressing select processing activities based on the processing recommendations. More specifically, the master transceiver can suspend or slow down equalizer and canceller coefficient adaptations based on the processing recommendations. Slowing down the coefficient adaptations can include either reducing the frequency of the adaptation or reducing the gain of adaptive algorithms. Exemplary equalizers include DFE (decision feedback equalizer) or FFE (feed forward equalizer). Exemplary cancellers include echo, FEXT (far-end cross-talk) and NEXT (near-end cross-talk).

The master transceiver 100 can additionally transmit training signals that can aid the slave transceiver 110 in re-acquiring (improving) its phase-lock. As previously described, the slave clock is designated as "locked" if data transmitted between the master transceiver and the slave transceiver has an estimated signal quality above a predetermined threshold. If the estimated signal quality is below above the threshold, then the slave clock is designated as "un-locked".

Another embodiment includes the slave transceiver 110 indicating to the master transceiver 100 that the slave transceiver is vulnerable to losing phase-lock. The master transceiver 100 can adapt its processing to minimize distortion of the data signals to help the slave transceiver maintain phase-lock. The slave transceiver 110 can be vulnerable to losing phase-lock during certain slave transceiver processing, such as, the slave transceiver 110 adjusting its phase-locked loop bandwidth (as will be described later) or the slave transceiver 110 changing transmission from half-duplex to full-duplex, the slave transceiver 110 changing its power back-off, or the slave transceiver 110 enabling THP pre-coding.

FIG. 2 is a flow chart showing steps of one example of a method of synchronizing master and slave transceivers. A first step 210 includes the master transceiver transmitting data signals that are received by the slave transceiver. A second step 220 includes the slave transceiver locking a slave clock to the data signals with a slave phase-locked loop. A third step 330 includes the slave transceiver transmitting slave clock information to the master transceiver.

One embodiment of the slave clock information includes an indicator of whether the slave clock is locked to the data signals transmitted by the master transceiver. For the 10GBase-T Ethernet protocol, the indicator can be a bit of an Info-Field, that includes a single bit that indicates "lock" or "unlocked". As previously described, the slave clock is designated as "locked" if data transmitted between the master transceiver and the slave transceiver has an estimated signal quality above a predetermined threshold. The threshold can change at different stages of training or startup of the master and slave transceivers. If the estimated signal quality is below the threshold, then the slave clock is designated as "un-locked".

One example of a threshold is an estimated BER of $10^{-4}$ for training signals. That is, if the estimated BER is greater than of $10^{-4}$, then the lock bit is set to indicate un-lock. Methods of estimating BER are well known in the art of digital communications. However, as previously mentioned the threshold can be variable.

Another embodiment includes estimating a phase error of the phase-locked loop. If the phase error is greater than a threshold, then the lock bit is set to indicate un-lock. An exemplary phase error threshold is 5% of a symbol period.

For another embodiment, the slave clock information includes one or more indicators of transmission processes of the master transceiver that are likely to cause the slave clock to lose phase-lock (that is, degrade the phase-lock to below an acceptable level causing an unacceptable rate of data error in the data signals) with the data signals transmitted by the master transceiver. These processes can be, for example, the master transceiver changing power back-off, the master transceiver changing transmission from half-duplex to full-duplex, or the master transceiver enabling THP pre-coding.

For another embodiment, the slave clock information includes one or more indicator of time periods indicating when the slave clock is vulnerable to losing phase-lock with the data signals transmitted by the master transceiver. These time periods can be, for example, the slave transceiver adjusting its phase-locked loop bandwidth, the slave transceiver changing its transmission from half-duplex to full-duplex, the slave transceiver changing its power back-off, or the slave transceiver enabling THP pre-coding.

When the slave transceiver is aware of slave processing that will cause the slave transceiver to be vulnerable to losing phase-lock, the slave clock information can include processing recommendations to the master transceiver. The processing recommendations can include recommendations to the master transceiver when to suppress certain master transceiver processing that can cause the slave clock to lose phase-lock with the data signals transmitted by the master transceiver. Of course, the master transceiver can choose to follow the recommendation or not. If the master does choose to follow the recommendations, the master transceiver suppresses select processing activities based on the processing recommendations.

FIG. 3 is a flow chart showing steps of one example of a method of a master transceiver aiding synchronization with a slave transceiver. A first step 310 includes the transceiver (master) transmitting data signals to a link partner (slave) transceiver. A second step 320 includes receiving slave clock information from the link partner transceiver. A third step 330 includes the transceiver adaptively adjusting processing according to the slave clock information provided by the link partner transceiver.

For an embodiment, adaptively adjusting the processing includes suppressing processing that introduces noise great enough to cause the link partner to lose phase-lock with the data signals. As previously described, these processes can include transceiver changing power back-off, the transceiver changing transmission from half-duplex to full-duplex, or the transceiver enabling THP precoding.

If the link partner loses phase-lock (that is, estimated signal quality of the data signals falls below a threshold) with the data signals, the transceiver can stop select types of processing of transmission signals received from the link partner.

The transceiver can transmits training signals to the link partner to aid the link partner in re-acquiring (that is, improving the quality) phase-lock with the data signals of the transceiver. The training signals include a known sequence of symbols that are used for data-aided synchronized processing.

Figure 4:
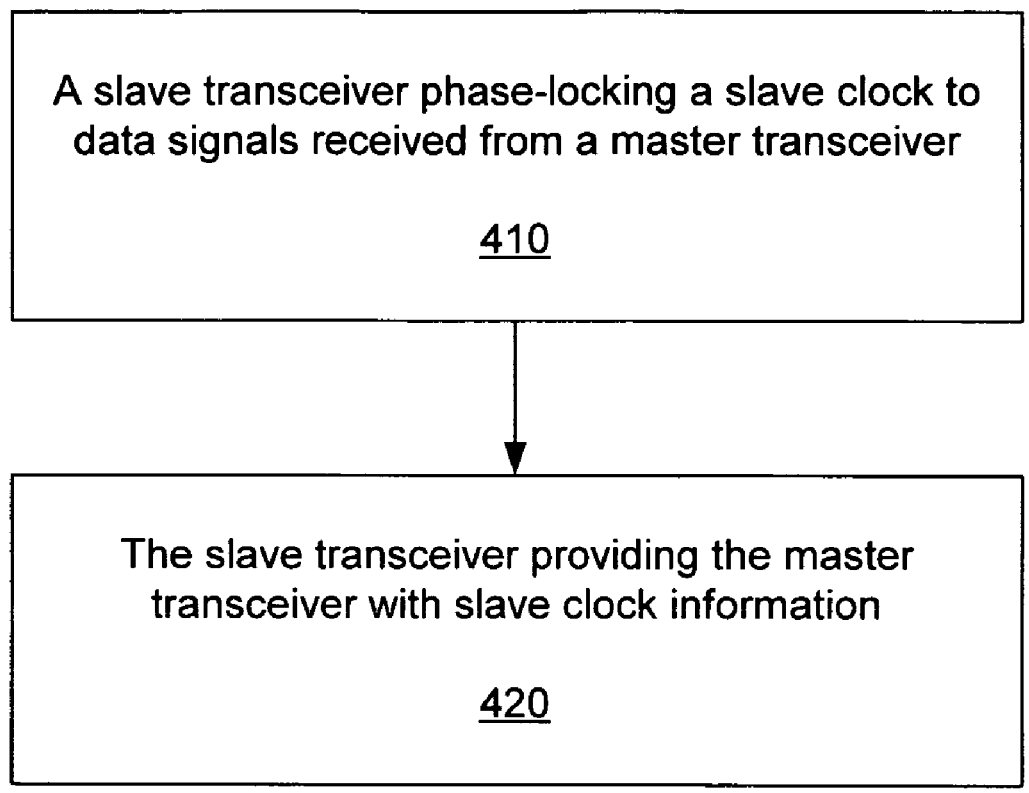
FIG. 4 is a flow chart showing steps of one example of a method a slave transceiver aiding synchronization with a master transceiver.
Figure 5:
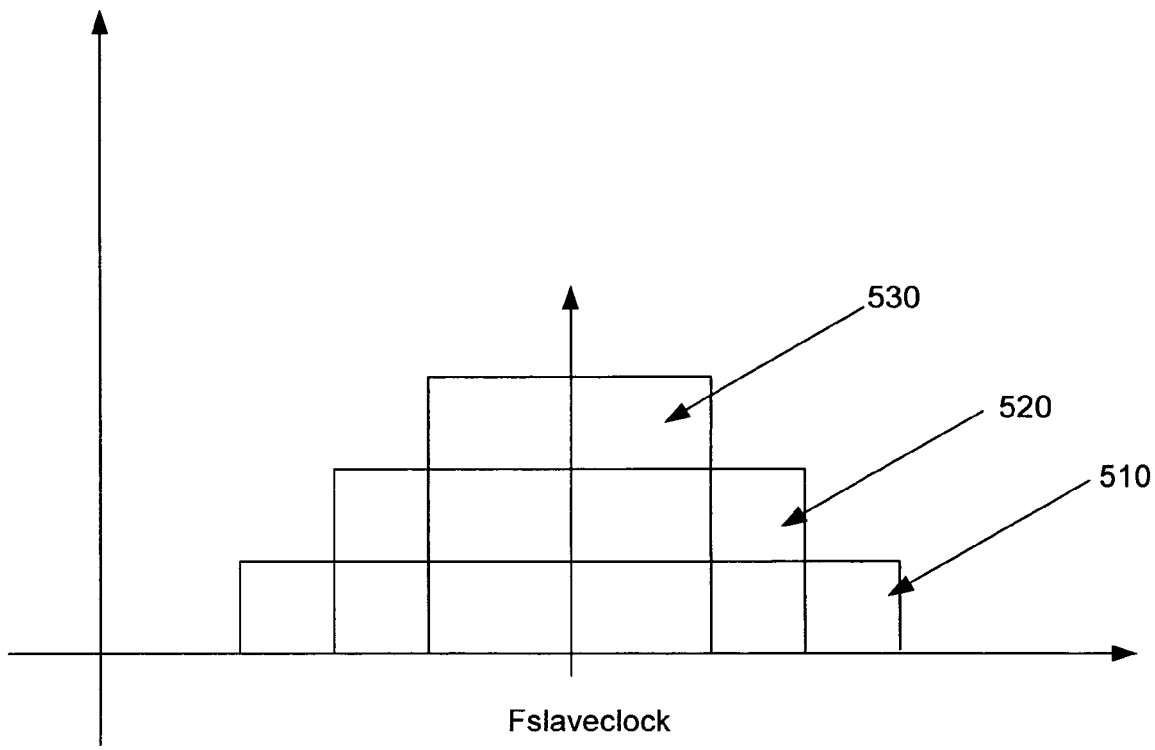
FIG. 5 shows a frequency spectrum, that depicts multiple bandwidth settings of a slave transceiver phase-locked loop.

FIG. 4 is a flow chart showing steps of one example of a method a slave transceiver aiding synchronization with a master transceiver. A first step 410 includes a slave transceiver phase-locking a slave clock to data signals received from a master transceiver. A second step 420 includes the slave transceiver providing the master transceiver with slave clock information.

As previously described, the slave clock information can include an indicator of whether the slave clock is phase-locked to the data signals transmitted by the master transceiver. Such an indicator can be a bit of an Info-Field of a 10GBase-T protocol. As previously described, the slave clock is designated as "locked" if data transmitted between the master transceiver and the slave transceiver has an estimated signal quality above a predetermined threshold. If the estimated signal quality is below the threshold, then the slave clock is designated as "un-locked".

Also, as previously described, the slave clock information can include one or more indicators of transmission processes of the master transceiver that are likely to cause the slave clock to lose phase-lock with the data signals transmitted by the master transceiver.

Also, as previously described, the slave clock information can include one indicator of time periods indicating when the slave clock is vulnerable to losing phase-lock with the data signals transmitted by the master transceiver.

Another embodiment includes another method of aiding synchronization between a master transceiver and a slave transceiver. This embodiment includes the slave transceiver estimating a receive signal quality per any of the previously described methods. If the receive signal quality is below a threshold, then the slave transceiver indicating this to the master transceiver. As previously described, the slave transceiver can indicate this to the master transceiver through a bit of an Info-Field of the 10GBase-T Ethernet protocol. If the master transceiver receives the indication from the slave transceiver, the master transceiver can change its adaptation processing. The changes can include either stopping master transceiver adaptation, or slowing it down by reducing the frequency or gain of adaptation or decreasing an amplitude of coefficient updates.

One embodiment of a slave transceiver includes the ability to adjust a bandwidth of the slave clock phase-locked loop bandwidth as shown in FIG. 6. A first phase-locked loop bandwidth 510 is larger, but has a lower loop gain. A second loop bandwidth 520 is smaller than the first loop bandwidth 510, but has greater loop gain. A third loop bandwidth 530 is the smallest, but has the greatest loop gain. Clearly, any number of loop bandwidths can be used.

For normal operating mode, the phase-locked loop can be configured to have the smallest loop bandwidth (as indicated by the third loop bandwidth 530) which has the largest loop gain. Therefore, during normal operation, the phase-locked loop is exposed to less noise, and therefore, provides a more stable clock. However, because the loop bandwidth is smaller, the phase-locked loop can only correct for smaller deviations between the clock and the estimated link partner clock. For a phase-locked loop acquisition mode, the phase-locked loop bandwidth can be increased to either the first or second loop bandwidths 510, 520. At the higher bandwidths, the phase-locked loop can correct for greater deviations, but is more susceptible to the effects of noise. Therefore, the clock is less stable and includes more jitter. If the link partner in notified it can take preventive actions to minimize the effects of the high jitter.

This embodiment of the slave transceiver includes the slave transceiver indicating to the master transceiver that during, for example, phase-lock acquisition, the master should/could refrain from data processing that introduces excessive amounts of noise or distortion onto the master transceiver data signals, because the slave transceiver is more susceptible to the effects of the noise and/or interference.

Although specific embodiments of the invention have been described and illustrated, the invention is not to be limited to the specific forms or arrangements of parts so described and illustrated. The invention is limited only by the appended claims.

What is claimed:

1. A method of aiding synchronization between a master transceiver and a slave transceiver, comprising:
   the master transceiver transmitting data signals that are received by the slave transceiver;
   the slave transceiver locking a slave clock to the data signals with a slave phase-locked loop;
   the slave transceiver transmitting slave clock information to the master transceiver, wherein the slave clock information comprises an indicator of whether the slave clock is locked to the data signals transmitted by the master transceiver, and wherein the slave clock is designated as locked if data signals transmitted between the master transceiver and the slave transceiver have a signal quality above a predetermined threshold.

2. The method of claim 1, wherein the data signals include training signals.

3. The method of claim 1, wherein the indicator is a bit of an Info-field of a 10 GBase-T protocol.

4. The method of claim 1, wherein the slave clock information comprises at least one indicator of transmission processes of the master transceiver that degrade phase-lock, causing data errors in the data signals
   degrade the phase-lock to below an acceptable level causing an unacceptable rate of data error in the data signals.

5. The method of claim 4, wherein the transmission processes comprise at least one of the master transceiver changing power back-off, the master transceiver changing from half-duplex transmission to full-duplex transmission, the master transceiver enabling THP.

6. The method of claim 5, wherein the slave clock information comprises at least one indicator of time periods, wherein the time periods include at least one of the slave transceiver adjusting its phase-locked loop bandwidth, the slave transceiver changing transmission from half-duplex to full-duplex, the slave transceiver changing its power back-off, the slave transceiver enabling THP.

7. The method of claim 1, wherein the slave clock information comprises processing recommendations to the master transceiver.

8. The method of claim 7, wherein the processing recommendations comprise requests to the master transceiver when to suppress certain master transceiver processing that can cause the slave clock to lose phase-lock with the data signals transmitted by the master transceiver.

9. The method of claim 7, wherein the master transceiver suppresses select processing activities based on the processing recommendations that cause the master adaptive processing to diverge.

10. The method of claim 9, wherein the master transceiver slows equalizer and canceller coefficient adaptations based on the processing recommendations.

11. A method of adaptively adjusting processing of a master transceiver, comprising:
   the master transceiver transmitting data signals to a link partner transceiver;
   master transceiver receiving slave clock information from the link partner transceiver;
   the master transceiver adaptively adjusting processing according to the slave clock information provided by the link partner transceiver;
   wherein the master transceiver slows selective types of processing of transmission signals received from the link partner because a quality of the phase-lock of the slave clock falls below a threshold.

12. The method of claim 11, wherein adaptively adjusting the processing comprises suppressing processing that cause the link partner to lose phase-lock with the data signals.

13. The method of claim 11, further comprising:
   the transceiver transmitting training signals to the link partner to aid the link partner in improving phase-lock with the data signals of the transceiver.

14. A method of maintaining phase-lock with a master transceiver comprising:
   a slave transceiver phase-locking a slave clock to data signals received from a master transceiver;
   the slave transceiver providing the master transceiver with slave clock information, wherein the slave clock information comprises an indicator of whether the slave clock is locked to the data signals transmitted by the master transceiver, and wherein the slave clock is designated as locked if data signals transmitted between the master transceiver and the slave transceiver have a signal quality above a predetermined threshold.

15. The method of claim 14, wherein the indicator is a bit of an Info-field of a 10GBase-T protocol.

16. The method of claim 14, wherein the slave clock information comprises at least one indicator of transmission processes of the master transceiver that degrade phase-lock, causing data errors in the data signals.

17. The method of claim 14, wherein the slave clock information comprises at least one indicator of time periods, wherein the time periods include at least one of the slave transceiver adjusting its phase-locked loop bandwidth, the slave transceiver changing transmission from half-duplex to full-duplex, the slave transceiver changing its power back-off, the slave transceiver enabling THP.

18. The method of claim 14, wherein the slave clock information comprises processing recommendations to the master transceiver.

19. The method of claim 14, further comprising the slave transceiver requesting the master transceiver to transmit training signals if a quality of the phase-lock of the slave clock falls below a threshold.

20. The method of claim 14, wherein the slave clock is designated as locked if data transmitted between the master transceiver and the slave transceiver has an estimated signal quality below a predetermined threshold.

* * * * *